E. SANDERS.
FRICTION CLUTCH LEVER LOCK.
APPLICATION FILED SEPT. 8, 1920.
1,405,336. Patented Jan. 31, 1922.
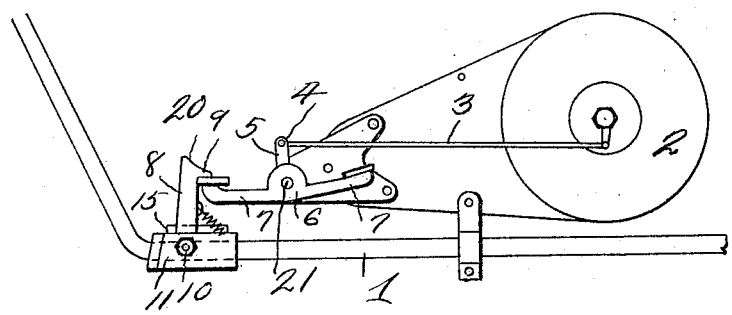
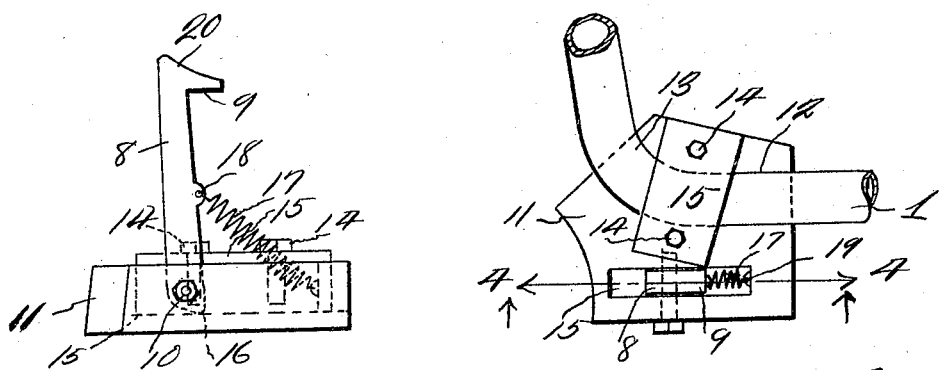
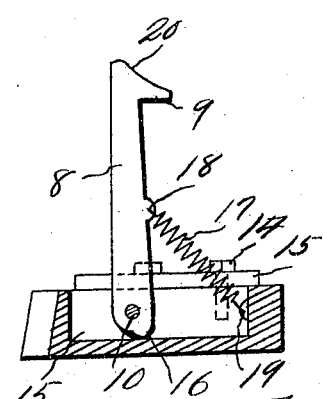
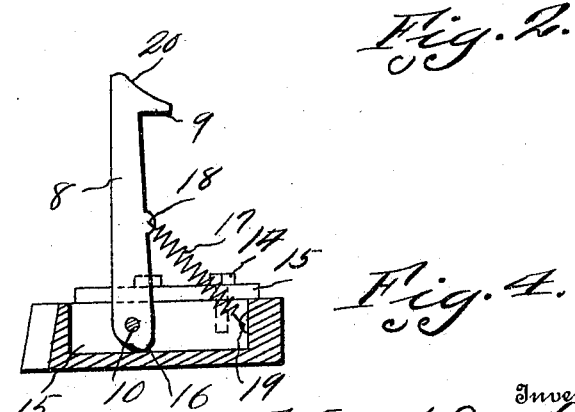
Inventor
Edward Sanders
By D. Swift
his Attorney

UNITED STATES PATENT OFFICE.

EDWARD SANDERS, OF MONROE, MICHIGAN.

FRICTION-CLUTCH LEVER LOCK.

1,405,336.  Specification of Letters Patent.  Patented Jan. 31, 1922.

Application filed September 8, 1920. Serial No. 409,040.

*To all whom it may concern:*

Be it known that I, EDWARD SANDERS, a citizen of the United States, residing at Monroe, in the county of Monroe, State of Michigan, have invented a new and useful Friction-Clutch Lever Lock; and I do hereby declare the following to be a full, clear, and exact description of the invention, such as will enable others skilled in the art to which it appertains to make and use the same.

The invention relates to lever locks for friction clutches of motor cycles and has for its object to provide a spring actuated catch member carried by the motorcycle frame and so positioned that its latching end may be disposed over the end of the clutch lever so that it will hold said clutch lever down and the clutch out of operation, thereby obviating the necessity of the operator maintaining a constant pressure on the clutch lever, which is a common difficulty with clutch levers now in use on motorcycles.

A further object is to provide a lever latch which is pivotally mounted in a bracket, said bracket being so constructed that it may be easily and quickly attached to the frame bar of the motor cycle adjacent the end of the clutch lever for hooking over the end of said clutch lever for holding the lever in down position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a portion of the motorcycle, showing the lever latch applied thereto and holding the pivoted clutch lever in down position.

Figure 2 is a top plan view of the lever latch and its supporting bracket.

Figure 3 is a side elevation of the lever latch and its supporting bracket.

Figure 4 is a sectional view taken on line 4—4 of Figure 2.

Referring to the drawings, the numeral 1 designates a portion of the motorcycle frame, and 2 a clutch carried thereby, which clutch is controlled through a connecting rod 3, the forward end of which is pivoted as at 4 to an arm 5 of a rockable foot lever 6. The rockable foot lever 6 is provided with oppositely extending arms 7. When either lever arm 7 is in down position as shown in Figure 1, the clutch 2 is out of operation. It has been found that the foot soon becomes tired by constantly holding down on one of the arms 7 when holding the clutch out of operation against its spring, therefore to obviate this difficulty a pivoted latch 8 having a hooked end 9 is pivoted as at 10 in a laterally disposed bracket 11. Bracket 11 adjacent one of its sides is provided with a semi-circular recess 12 for the reception of the bent portion 13 of the frame 1. Secured to the lower face of the bracket 11, by means of bolts 14, is a clamping plate 15, which plate when securely clamped by the bolts 14 maintain and hold the bracket 11 in a horizontal position. The latch 8 is pivotally mounted in a recess 15 adjacent the outer side of the bracket 11, said latch at a point below its pivotal point 10 is provided with a shoulder 16 which engages the bottom of the recess 15 and limits the forward movement of the latch under the influence of the coiled spring 17, which coiled spring has one of its ends connected to the latch 8, as at 18 and its other end connected as at 19. The spring 17 normally holds the latch 8 forwardly and in a substantially upright position as shown in Figure 4, therefore it will be seen that when the operator wants to hold the forward arm 7 in down position, all that is necessary for him to do is to engage the upper end 20 of the latch with the toe of his shoe and force the same forwardly at the same time that he rocks the lever 6 on its pivotal point 21. The arm 7 that has been forced downwardly may be held in down position by the hooked end 9 of the pivoted latch 8.

From the above it will be seen that a lever latch for clutch levers of motorcycles is provided which is positive in its operation, simple of construction and one which may be easly and quickly applied to motorcycles now in use.

The invention having been set forth what is claimed as new and useful is:—

The combination with a substantially horizontally disposed rockable controlling and operating lever for motorcycles, said lever being disposed above and adjacent the horizontally disposed portion of the frame of the motorcycle, of a latching device for holding one arm of said lever downwardly, said latching device comprising a horizontally disposed plate carried by the horizontally disposed portion of the frame and provided with a chamber, said plate being disposed substantially below one end of the lever, a latching member pivoted in the chamber of the plate and extending upwardly, a lug carried by the upper end of said latch and adapted to engage over one end of the lever, a spring for normally holding the latch in the direction of the lever and means for limiting the movement of the latch in the direction of the lever.

In testimony whereof I have signed my name to this specification in the presence of two subscribing witnesses.

EDWARD SANDERS.

Witnesses:
 RAY C. DULL,
 OUL SNYDER.